F. H. DOERR.
COMPUTING MACHINE.
APPLICATION FILED MAR. 16, 1917.

1,398,068.

Patented Nov. 22, 1921.
6 SHEETS—SHEET 1.

Inventor
Fred H. Doerr
By Moulton & Lurrance
Attorneys.

F. H. DOERR.
COMPUTING MACHINE.
APPLICATION FILED MAR. 16, 1917.

1,398,068.

Patented Nov. 22, 1921.
6 SHEETS—SHEET 2.

Inventor
Fred H. Doerr
By Moulton & Livrance
Attorneys.

F. H. DOERR.
COMPUTING MACHINE.
APPLICATION FILED MAR. 16, 1917.

1,398,068.

Patented Nov. 22, 1921.
6 SHEETS—SHEET 3.

Inventor
Fred H. Doerr
By Moulton & Lemanne
Attorneys.

F. H. DOERR.
COMPUTING MACHINE.
APPLICATION FILED MAR. 16, 1917.

1,398,068.

Patented Nov. 22, 1921.
6 SHEETS—SHEET 4.

Inventor
Fred H. Doerr
By Moulton and Lurrance
Attorneys

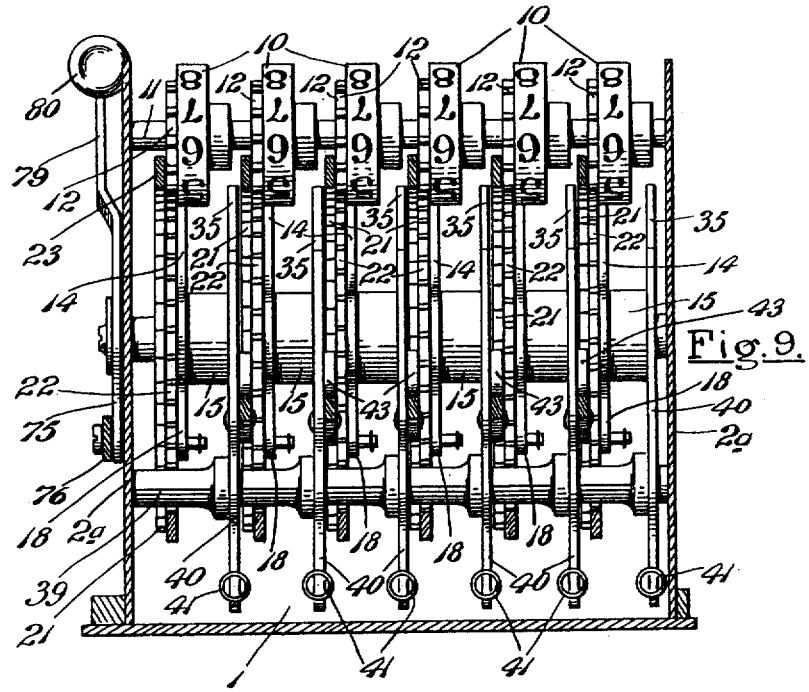
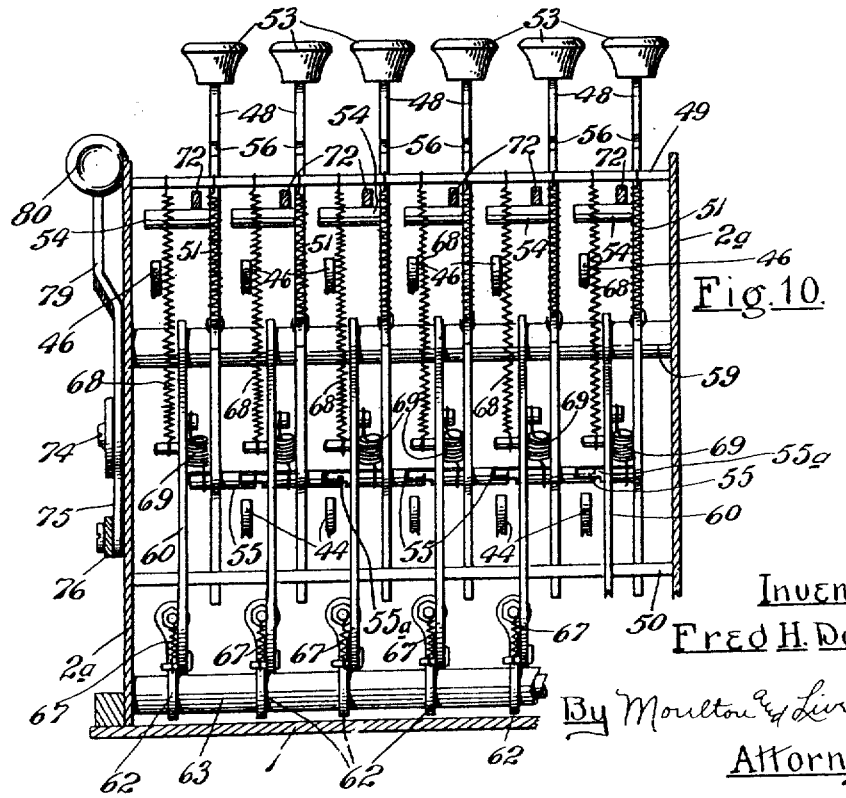

Inventor
Fred H. Doerr
By Moulton & Livrance
Attorneys

UNITED STATES PATENT OFFICE.

FRED H. DOERR, OF GRAND RAPIDS, MICHIGAN, ASSIGNOR, BY MESNE ASSIGNMENTS, TO WILLIAM D. BLEICK, OF NEWARK, NEW JERSEY.

COMPUTING-MACHINE.

1,398,068.   Specification of Letters Patent.   Patented Nov. 22, 1921.

Application filed March 16, 1917. Serial No. 155,251.

*To all whom it may concern:*

Be it known that I, FRED H. DOERR, a citizen of the United States of America, residing at Grand Rapids, in the county of Kent and State of Michigan, have invented certain new and useful Improvements in Computing-Machines; and I do hereby declare the following to be a full, clear, and exact description of the invention, such as will enable others skilled in the art to which it appertains to make and use the same.

This invention relates to a computing machine upon which various computing operations such as addition, subtraction, multiplication and division may be performed and the result indicated by the machine for ready observation. It is a primary object and purpose of my invention to make a machine of this character which while of compact and comparatively simple construction shall be accurate and exact in operation and at the same time durable and efficient and substantially proof against getting out of order.

A further feature of the invention consists in the provision of novel mechanism for "clearing" the machine either wholly or in part together with an especially novel and effective "carrying" mechanism. A still further feature of the invention consists in a novel mechanism for insurance against any overmovement of the parts of the mechanism beyond that desired by the operator under the momentum given them when operated. Many other objects and purposes not specifically enumerated together with novel mechanisms for attaining the same will be apparent from the following description taken in connection with the accompanying drawings which show a practical and operative embodiment of the invention and in which;

Fig. 9 is a vertical section substantially on the plane of line 9—9 of Fig. 2.

Fig. 10 is a similar section on the line 10—10 of Fig. 2, both Figs. 9 and 10 looking forward in a direction indicated by the arrows.

Like reference characters refer to like parts throughout the several views of the drawings.

Figure 1:
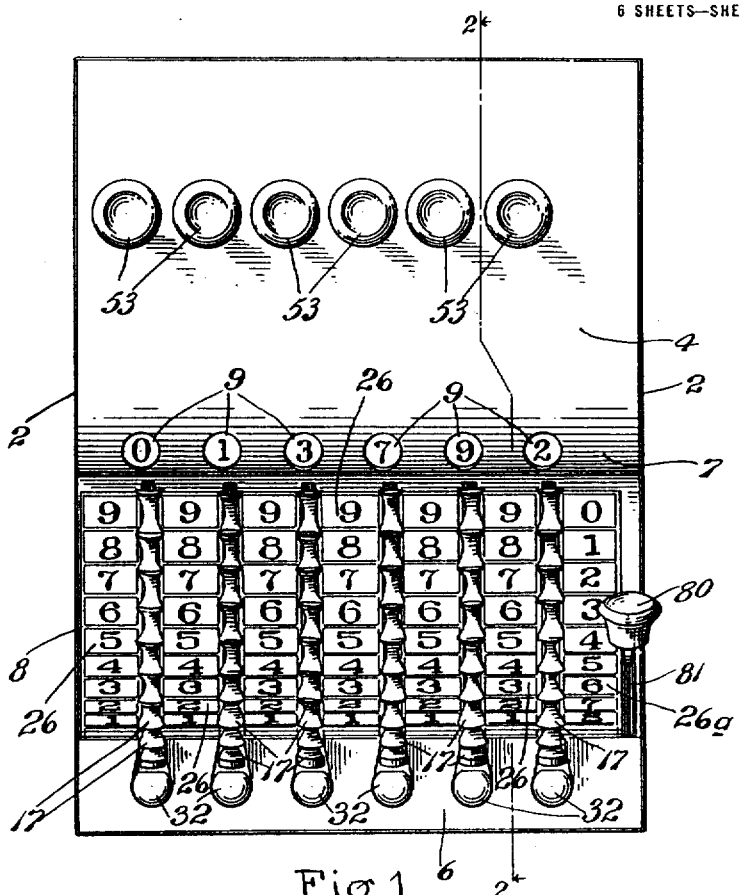
Figure 1 is a plan view of the machine.

The mechanism of the machine which I have invented is located above a base 1 and is practically inclosed by an outer casing having sides 2, a back 3 and a horizontal top 4 extending from the rear over substantially one-half of the machine. The casing also includes a vertical front side 5 substantially one-half of the height of the rear side 3 turned inwardly at its upper edge to provide a horizontal ledge 6. The top section 4 is curved downwardly at its front in the arc of a circle as indicated at 7 and the case is completed by an arcuate section 8, having a relatively large radius of curvature, integral with and connecting the rear of the ledge 6 with the lower part of section 7. A number of openings 9 are made in section 7 of the casing 1 back of which are indicating disks 10, loosely mounted upon a transverse shaft 11. Shaft 11 at its ends is carried by vertical spaced apart plates 2ᵃ located immediately within and paralleling the sides 2 of the housing or casing, it being designed that the mechanism shall be carried entirely on a supporting frame comprised of pieces 2ᵃ and the base 1 and that the housing or casing may, if desired, be removed for access to the mechanism.

The indicating disks 10 may be of any desired number depending upon the number of rows or columns of figures which the machine is designed to handle. Around each disk a plurality of figures are printed and evenly spaced from each other ranging from 0 to 9 in consecutive order. A pinion 12 having ten teeth is secured at the side of each disk and is movable therewith.

Figure 2:
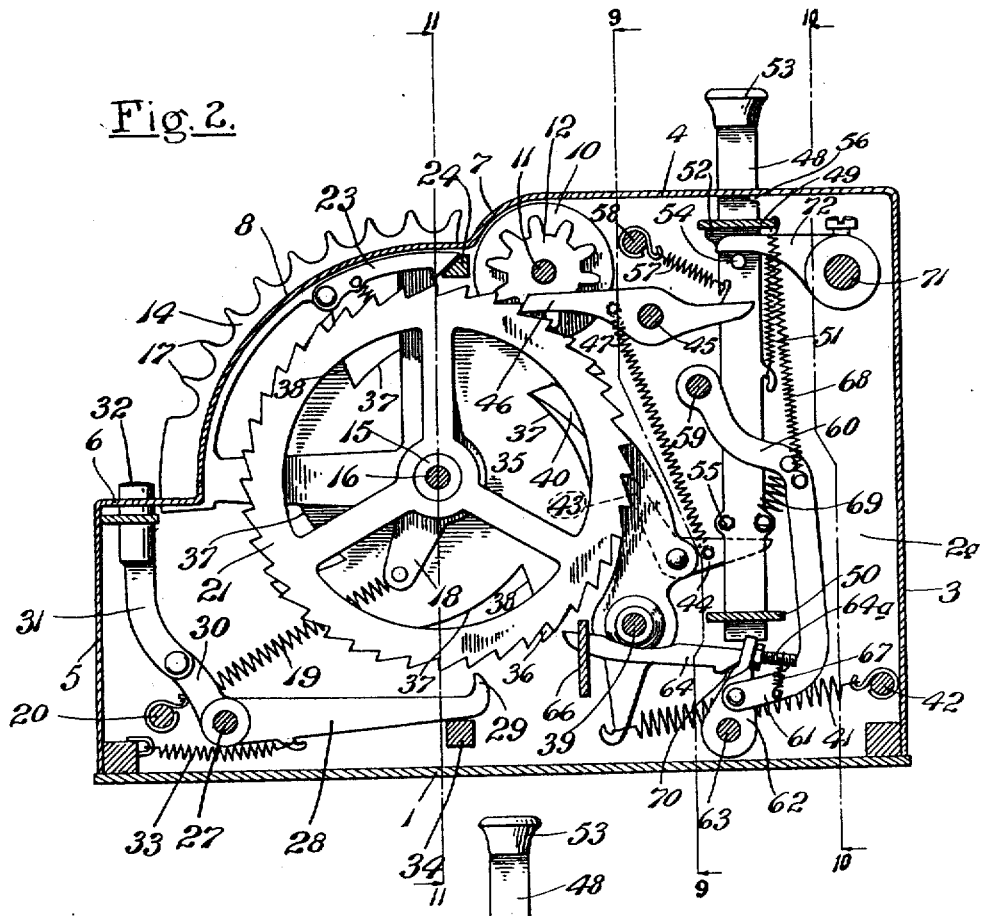
Fig. 2 is a vertical section taken substantially upon the line 2—2 of Fig. 1, and showing the mechanism in side elevation in normal cleared position.
Figure 11:
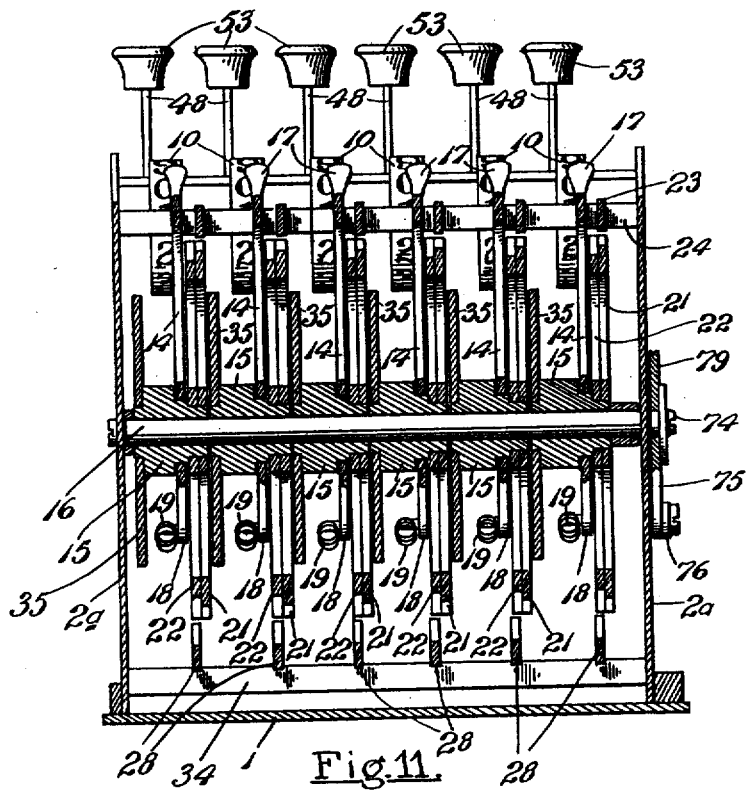
Fig. 11 is a vertical section substantially upon a plane of line 11—11 of Fig. 2, looking to the rear end.

The curved section 8 of the casing is provided with a plurality of vertical slots 13 below the openings 9. Through each of said slots an operating quadrant 14 projects it being loosely mounted upon a hub 15 which in turn is loosely mounted upon a horizontal shaft 16. There is one of these quadrants and hubs for each of the indicating disks 10 and all of the hubs are loosely mounted upon the shaft 16 covering nearly the full length thereof, the end hubs being spaced from the vertical supports 2ª by suitable collars as shown in Fig. 11. A series of spaced projections 17 are formed at the outer curved edge of each quadrant, any space between any two projections being adapted to receive the finger of the operator. Each quadrant is provided with nine of these spaces. An arm 18 is formed integral with each quadrant and projects below the pivotal mount therefor. A coil spring 19 is secured at one end of each arm all of the springs having connection at their other ends to a transverse rod 20. The tendency of the springs is to hold the quadrants in upper position as shown in Fig. 2 and whenever free to do so the operating quadrants return to such position.

Figure 12:
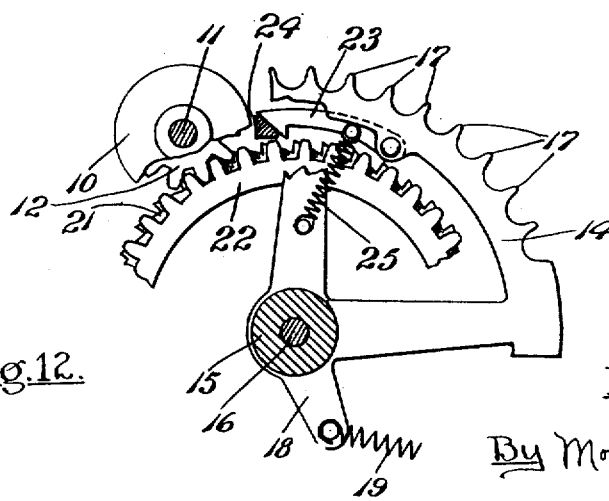
Fig. 12 is a fragmentary side elevation from the side of one of the computing units and associated mechanism opposite to that shown in Fig. 8.

Associated with each quadrant and secured to each bushing at the right hand end thereof is a ratchet wheel 21 provided with forty teeth around its circumference. A gear wheel 22 also having forty teeth is located alongside the ratchet wheel arranged between it and its associated quadrant 14. Wheels 22 are in mesh with the pinions 12. A hook 23 is pivotally connected to each quadrant 14 and located so as to connect with the associated ratchet wheel 21. Normally in the upper position of the quadrants the inclined rear ends of the hooks bear against the inclined side of a horizontal bar 24 laying above the ratchet and gear wheels. A spring 25 connected to each hook and an arm of a quadrant, as shown in Fig. 12, has a normal tendency to draw the hook into engagement with the associated ratchet wheel as soon as downward movement of said quadrant is begun and carried out sufficiently to move the hook away from the bar 24.

To the left of each operating quadrant of the machine on the section 8 of the casing, a vertical row of figures, indicated at 26, is printed reading upwardly from 1 to 9 in consecutive order. The figures are properly located to correspond with and number the finger spaces in the quadrants. In addition to the right hand quadrant a vertical row of figures indicated at 26ª is imprinted or otherwise placed upon the section 8 of the casing reading downwardly from zero to 9 in consecutive order.

It is apparent that with any indicating disk 10 showing a zero through the opening 9, operation of the quadrant 14 directly below it in a downward direction the full distance which it can travel after the finger of the operator has been engaged with one of the notches therein, indicates the same figure through the opening 9 that was to the left of the notch engaged by the finger of the operator; and if previous to said operation, the indicating disk shows any other figure than zero, after the operation said disk will show a number which is the sum of the figure that was first shown plus the number opposite the notch engaged by the finger of the operator. It, of course is understood that if the sum of the two figures is more than nine, the indicating disk associated with the quadrant operated will show only the second figure of said sum.

Figure 8:
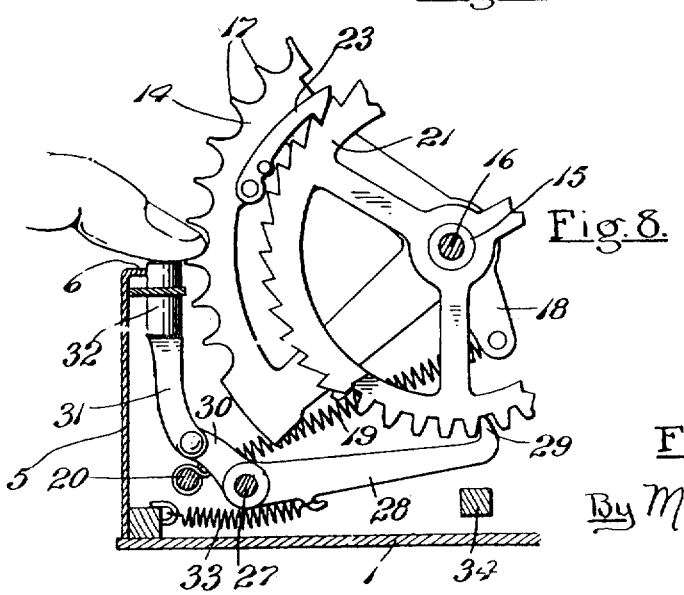
Fig. 8 is a fragmentary view similar to Fig. 4, showing the operation of the lock mechanism which prevents overthrow of the parts operated.

When a quadrant is engaged by the finger of the operator in any notch thereof it may be moved downwardly until the finger engages with the ledge 6. I have provided mechanism to lock and prevent any overthrow of the ratchet wheel 21 and associated parts beyond the point to which it is operated. A horizontal rod 27 is interposed between the sides 2ª at the lower front part of the machine on which a plurality of bell crank levers are mounted one for each gear 22. The rearwardly extending arm 28 of each lever has an upturned hook 29 adapted to one position to engage between successive teeth on its associated gear wheel. To the forward arm 30 of each bell crank lever a bar 31 pivotally connects, at its upper end, carrying a head 32 which in normal position projects slightly above ledge 6. A coil spring 33 under tension connecting to the arm 28 of each bell crank lever normally holds the arm 28 in lower position so that it rests upon the horizontal bar 34 below it and raises the head 32 above ledge 6. In the operation of any quadrant the finger, before it can get to the ledge 6, engages the head 32 underneath and depresses the same and, as shown in Fig. 8, elevates the hook 29 so that it passes between two of the teeth of the gear 22. The gear and quadrant are so designed that whenever the finger of an operator in a notch of a quadrant bears against a head 32 sufficiently to elevate a hook 29, said hook will properly enter a space between two of the teeth of the gear thereby stopping any tendency of the gear or any of its associated parts to pass, under the momentum thereto in operation, beyond the point desired.

Each hub 15 at the end opposite to that on which the ratchet wheel 21 is connected carries a cam member 35 which lies alongside the ratchet wheel on the adjacent bushing to the left. The member 35 is provided with four cams 36 each bounded by an outer curved cam surface 37 and a side or shoulder 38 as shown, the outer ends of sides 37 and 38 coming to a point. The cam surface 37 at one end is located nearer the bushing 15 than at the other and is curved with a progressingly increasing radius of curvature to the point where it meets the shoulder 38, there being what may be termed deep notches in each member 35 as shown. Back of and below members 35, a transverse shaft 39 is located on which a plurality of dogs 40 are loosely mounted. The pivotal mount of said dogs is between the ends thereof and each has a downwardly extending arm with which the forward end of a coiled spring 41 is connected, all of said springs at their rear ends having connection to a transverse rod 42. The springs cause the upper end of dogs 40 to bear against the surfaces of the associated cam members 35. Each dog 40, above the shaft 39, carries a pivotally mounted bell crank lever, including an upwardly extending arm or dog 43 and a rearwardly extending arm 44. Above the shaft 39 a second transverse shaft 45 is located on which dogs 46 are pivotally mounted between the ends thereof. There is a dog 46 for each ratchet wheel 21 mounted in the same vertical plane therewith. A coil spring 47 is connected at its upper end to each dog 46 at a point in front of the shaft 45, at its lower end connecting to the arm 44 of the bell crank lever directly below it. The influence of the spring normally engages dog 46 with the teeth of the adjacent ratchet wheel to the left and at the same time throws the arm 43 forward into engagement with the same ratchet wheel.

Figure 4:
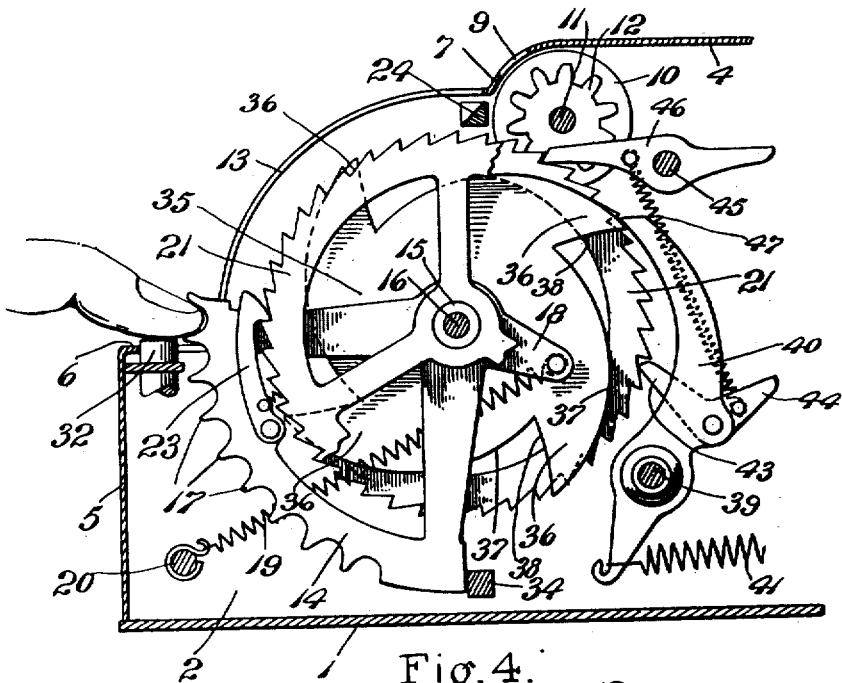
Fig. 4 is a view similar to Fig. 2 of the front portion of the mechanism of the machine with parts broken away to better disclose the same, illustrating the position of the parts when an operating member has been moved substantially to the limit of its travel in a downward direction.
Figure 5:
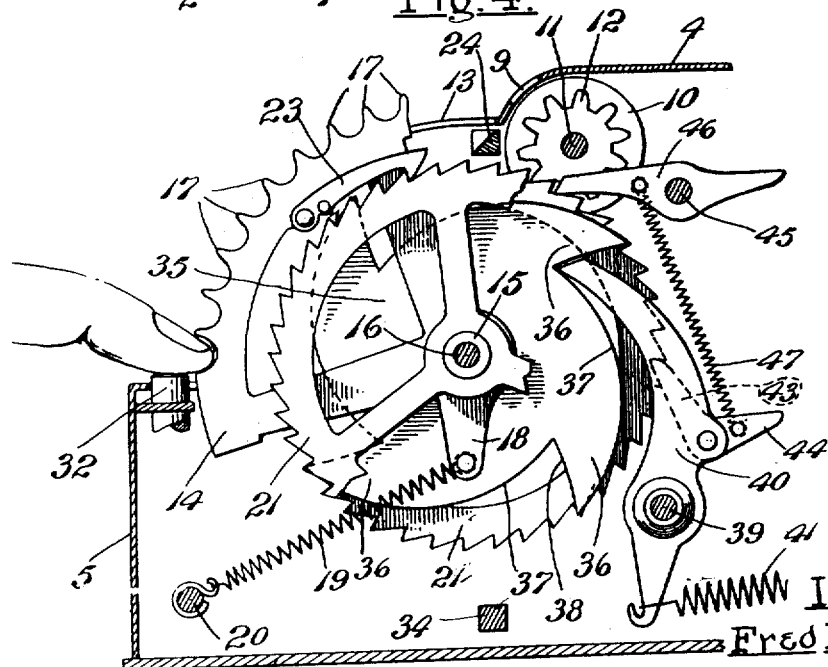
Fig. 5 is a view similar to Fig. 4, the parts of the mechanism shown in Fig. 4 having been moved an additional step.

When an indicating disk 10 stands at zero the dog 40 associated with the same computing unit seats in one of the notches in the member 35 and against one of the shoulders 38 as indicated in Fig. 2. With the operation of the associated quadrant, cam member 35 is turned and dog 40 at its upper end is moved to the rear over one of the cam surfaces 37 passing farther along said surface and farther to the rear as the indicating character on the disk 10 increases in amount. In Fig. 4 the disk 10 is at the position where the figure 9 shows through the opening 9 in the casing. In Fig. 5 it will be noted one additional step has been given to the unit such that the zero character will appear on disk 10 back of said opening 9. When this occurs the upper end of the dog 40 passes the point of the cam 36 and drops into the notch behind the succeeding shoulder 38. Referring again to Fig. 4, it will be noted that the arm 43 engaging with the ratchet wheel 21 on the unit to the left, has in Fig. 5, moved upwardly with the forward movement of dog 40 to turn said ratchet wheel one step or space, the parts being so designed as to effect this turning movement. Accordingly, when, in the process of addition, the mechanism for any disk reaches a point such that the addition of another number increases the sum to more than 9 and requires carrying into the column to the left, such carrying is automatically effected by the inward movement of the upper end of the dog 40 as it drops behind the point of a cam 36 and the upward thrust imparted thereby to the bell crank lever arm 43 which is engaged with the ratchet wheel for the next higher column to the left. Inasmuch as the computing mechanisms for each column are duplicates, the carrying operation in all cases to the next higher column is identically the same. It will be noted that the pressure of the upper end of dog 40 on the cam surface 37 has a tendency to rotate the cam member 35 in a backward direction, this being normally checked and controlled by the engagement of the upper dog 46 with the ratchet wheel 21.

Figure 6:
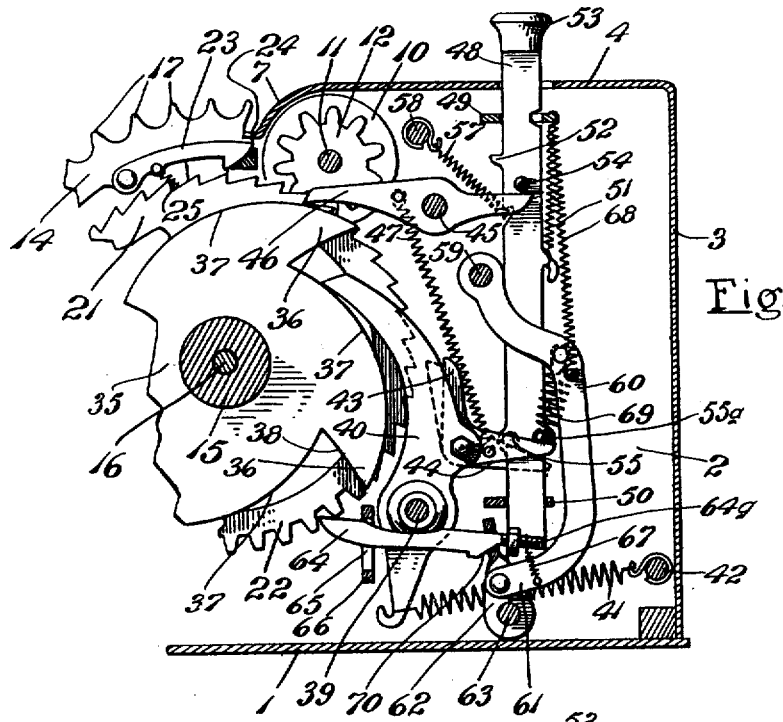
Fig. 6 is a view similar to Fig. 2 of the rear or clearing part of the mechanism of the machine illustrating the first part of the clearing operation.

The mechanism for clearing the machine either wholly or any column thereof will now be described. A clearing bar 48 is positioned back of and associated with each computing unit of the machine, all of the bars being vertical and slidably mounted in upper and lower transverse plates 49 and 50 and extending at their upper ends through the top 4 of the case. A coil spring 51 connected to each bar and the upper plate 49 holds them normally in upper position with a stop 52 on each bar engaging against the under side of the upper plate 49. An operating head 53 is fixed to the upper end of each of the bars 48 for use in manually depressing the same. Upper and lower pins 54 and 55 project laterally in opposite directions from each of the bars 48 whereby, on depression of any bar, said pins engage, respectively, with the rear end of the dog 46 associated with the ratchet wheel of the computing unit with which bar 48 is associated, and with the rear arm 44 of a bell crank lever the other arm of which bears against the ratchet wheel 21 of the computing unit to the left. There is also a third pin 55' on each bar 48 directly back of pin 55 and extending in the opposite direction over an arm 44 of the lever which engages with the same ratchet wheel 21 with which said dog 46 engages. Each bar in its rear edge and a short distance below its upper end is provided with a notch 56 which, when a bar has been partially depressed, as indicated in Fig. 6, adapts it to be turned slightly to the rear to engage with the upper plate 49. It will be noted in this connection that when depressed this amount pins 55 and 55ª engage with their respective bell crank arms 44 but that pin 54 does not yet come into contact engagement with its dog 46. Normally each bar 48 on depression and release returns to upper position, its upper end being drawn forward by spring 57 connected thereto and to a rod 58.

On a transverse rod 59 a plurality of irregularly shaped members 60 are pivotally mounted. As shown, said members bend to the rear for a distance below the pivot and thence extend substantially straight down at their lower ends curving forward to make arms 61 each of which at its end is pivotally connected to a member 62 loosely mounted upon a rod 63. A kicker 64 passes loosely at its rear end through an opening in the upper end of each member 62 and at its front end passes through an elongated vertical slot 65 in a vertically positioned plate 66 which is located below and back of the computing units. The kickers 64 are in the same vertical planes with the gears 22. The rear end of each kicker 64 is shaped into a rod and screw threaded to receive an adjusting nut and a spring 67 is connected to said rear end and to the arm 61 of the member with which it is associated. Coil springs 68 are attached at their upper ends to plate 49 and at their lower ends one to each member 60 to the rear of rod 59, thereby turning said members 60 and 62 to the rear until stopped by the engagement of the forward end of kickers 64 with plate 66 as shown in Fig. 2. A strong spring 69 is interposed between and connects each clearing bar 48 and each member 60.

Figure 7:
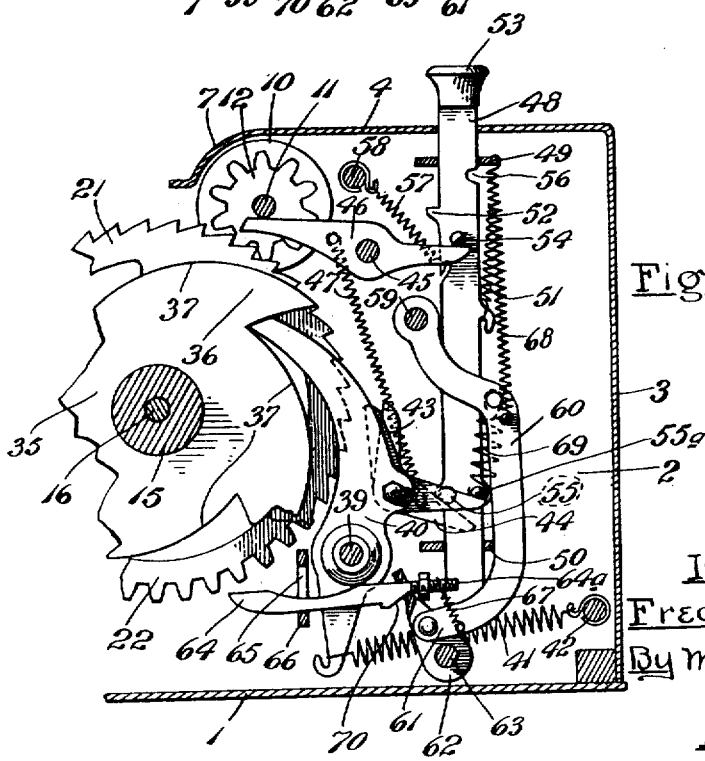
Fig. 7 is a similar view of the clearing operation having reached its final step.

When it is desired to clear a computing unit the associated clearing bar 48 is depressed whereupon spring 69, being stronger than spring 68, turns the member 60 forward about its pivot until the front end of the kicker 64 engages with a tooth of the gear 22. This happens practically as soon as or very shortly after the initiation of the downward movement of the bar 48. The next operation is the engagement of pin 55ª with the arm 44 of the bell crank lever freeing its dog 43 from the ratchet wheel 21 the ratchet wheel 21 of the computing unit to the left being also freed of its dog 43 through pin 55; and finally pin 54 engages with the rear end of dog 46 disengaging the dog from the ratchet wheel of the unit which is to be cleared. In the meantime, it will be observed, the end of the kicker 64 has been forced against the gear wheel 22 and the pressure has been continuously increasing due to the fact that spring 69 has been continually stretched so that by the time dog 46 is disengaged from ratchet wheel 21 the spring 69 has stored up a relatively large amount of energy to impart to the kicker as soon as dog 46 is disengaged. When this occurs the kicker is projected forward under the impulse given by spring 69 and imparts a rotary movement to the gear 22 in a reverse direction whereupon this gear and all the parts associated and movable therewith rotate in a reverse direction until the dog 40 engages with a shoulder 38 on cam member 35, stopping the computing unit with the zero character on the indicating disk 10 showing. It will be noted that the connection of the kicker 64 to the member 62 is a loose one and that the kicker is provided with an inclined surface 70 directly in front of the upper end of said member 62 so designed that after the impulse has been given to gear wheel 22, the kicker is disengaged therefrom and moved to a lower position as shown in Fig. 7.

To clear the entire machine all of the clearing bars 48 may be manually depressed in unison but in practice it is better to have a single device for attaining this end. Accordingly, on a shaft 71 in the upper rear portion of the machine I have mounted a plurality of forwardly projecting fingers 72 one of which comes over each pin 54. An arm 73 depends from one end of shaft 71 and a bell crank lever is pivotally connected by means of a screw 74 to the same end of the shaft 15 on the outside of one of the supporting sides 2ª of the machine.

The bell crank lever includes a downwardly projecting arm 75 which is connected to the lower end of the arm 73 by a link 76. In practice a pin 77 connects the rear end of the link with the lower end of arm 73 and is movable back and forth through a head 78 in the side 2ª. The operating lever also includes an upwardly and forwardly extending arm 79 provided at its free end with a head 80 for manual operation. Said arm 79 extends through a slot 81 in the housing or casing of the machine. It is clear that by depressing the head 80 the forward ends of all of the fingers 72 are moved downwardly thereby depressing all of the clearing bars 48 in unison and affecting the complete clearing of the machine.

With a machine constructed as described the operation of adding is very simple. All that is necessary is to place the fingers of the operator in the notches of the operating quadrants opposite the figures of columns 26 corresponding to the number to be added and move said quadrants down until the fingers are stopped by the ledge 6. For instance, if to any number appearing on the disks it is desired to add any number, such as 253, the operator places one finger opposite the figure 2 in the third or hundreds operating quadrant, another in the notch opposite 5 in the second or tens quadrant and another in the notch opposite 3 in the first or units quadrant and the indicating disks 10 after the quadrants have been operated with the fingers in such notches will show the sum through openings 9.

Figure 3:
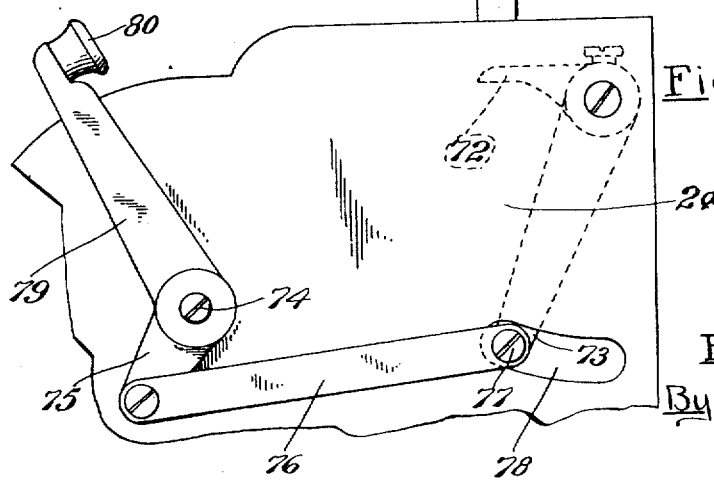
Fig. 3 is a fragmentary side elevation of the upper rear part of the machine the covering casing therefor being removed.

By means of this machine subtraction may also be accomplished. The operation can best be described by a concrete example. For instance, suppose that 387 is to be taken away from the number indicated in Fig. 1. The first operation is to depress the fourth clearing bar from the right, or the one associated with the thousand column, to the point shown in Fig. 6 and hold it in such position, the bar being forced slightly to the rear so that its notch receives the plate 49. This will prevent carrying to said thousands column. The next operation is to engage the operating quadrant for the hundreds column at the space directly opposite the figure 3 in the column 26ᵃ and operates said quadrant until the finger is stopped by the ledge 6. The finger is then engaged with the operating quadrant for the tens column at the place opposite the figure 8 in column 26ᵃ, this quadrant being operated in the same manner. And finally the finger is engaged with the space in the units quadrant in the space opposite the figure 8 or column 26ᵃ or in a space one below that of the units to be subtracted. The clearing bar for the thousand column is then released and the remainder is shown by the disks through the openings 9. This method of subtraction is substantially the same as in many other types of so called adding machines which, in reality, are capable of various computations besides adding. As multiplication is a series of additions it is obvious that the same can be readily performed on this machine, and, in the same way, division being a series of subtractions the machine may also be used for accomplishing the same.

A machine of the character described is very compact and may be readily carried. It is substantially fool proof being effectually guarded from over throw or reverse movements of parts of the mechanism except when desired. On this machine practically everything can be accomplished that is accomplished on any of the larger machines except the recording of results obtained. The greater portion of the mechanism consist of stampings and many parts are duplicates whereby it may be economically manufactured.

Many changes in constructive detail may be resorted to without departing from my invention and I accordingly do not consider my invention as limited to the specific disclosure made but consider myself entitled to all modifications of structure falling within the scope of the appended claims defining the invention.

I claim:—

1. In a computing machine, a casing provided with a plurality of spaced horizontal openings in the top thereof and with vertical slots below each opening, a horizontal ledge to the casing below said slots, an indicating disk rotatably mounted back of each opening in the casing, an oscillatory operating quadrant rotatably mounted inside of the casing and extending through each slot, mechanism connecting each quadrant and a disk for turning the disk on operation of the quadrant in a downward direction, means yieldingly holding each quadrant in upper position, and means for operatively engaging each quadrant at a plurality of points on its outer surface.

2. In a computing machine, a computing unit comprising a rotatably mounted hub, a ratchet wheel secured to one end of the hub and yieldably urged in one direction, a gear wheel located along side of and movable with the ratchet wheel, an operating quadrant loosely mounted on the hub, alongside the gear wheel, a spring actuated hook on said quadrant to engage with the teeth of the ratchet wheel, an indicating disk rotatably mounted back of and above said gear wheel and a pinion secured to the disk and meshing with the gear wheel.

3. In a computing machine, a computing unit comprising a rotatably mounted hub, a ratchet wheel secured a tone end of the hub, an operating quadrant loosely mounted on the hub and yieldably urged in one direction, a spring actuated hook on the quadrant to engage with the ratchet wheel, to turn the same on operation of the quadrant in one direction, an indicating disk rotatably mounted back of and above the hub and ratchet wheel, and connections between the ratchet wheel and indicating disk for turning the disk simultaneously with the turning of said ratchet wheel.

4. In a computing machine, a computing unit comprising a rotatably mounted hub, an oscillatory operating quadrant loosely mounted thereon, having peripheral operating means arranged at intervals, an indicating disk rotatably mounted above and back of the hub, and mechanism connecting said quadrant and disk for turning the disk predetermined amounts on operation of the quadrant.

5. In a computing machine, a covering casing, a plurality of computing units located in alinement within the casing, each including a rotatably mounted hub, an operating quadrant loosely mounted on each hub and projecting through a slot in the front of the casing, said quadrants being adapted for engagement by the fingers for operation in a downward direction, means yieldingly holding the quadrants in upper position, a gear fixed on each hub, a ratchet wheel positioned alongside each gear and movable therewith, an indicating disk driven by each gear, a spring actuating hook on each quadrant for engagement with the ratchet wheel on the same hub, and a horizontal ledge to the casing below the slots in the casing.

6. In a computing machine, a covering casing having a forwardly and downwardly curved front side and a horizontal ledge below said side, said side and ledge being provided with communicating transverse slots, a plurality of computing units positioned in alinement inside the casing, each including a rotatably mounted hub, an operating quadrant loosely mounted on each hub and extending through said slots in the casing, means arranged at intervals on the outer edge of each quadrant adapted for engagement by the fingers of an operator, a gear on each hub, means for transmitting motion from the quadrants to the gears, an indicating disk driven by each gear, a lever pivotally mounted below and in front of each gear, a hook at the rear end of each lever adapted to engage between teeth of a gear, means normally holding the hooks out of engagement with the gears, and an operating member for each lever having a head extending upwardly through the ledge directly in front of each quadrant.

7. In a computing machine a plurality of complementary units mounted in alinement, each including a rotary hub, an oscillatory operating quadrant loosely mounted on the hub and provided at intervals with operating means, a ratchet wheel and gear located at and secured to one end of the hub, a cam member fixed to the opposite end of the hub and provided at intervals with shoulders and having cam surfaces between the shoulders, means carried by the quadrant for operating said ratchet wheel, a spring actuated dog engaging said cam member, and means for releasing the dog therefrom.

8. In a computing machine, a shaft, a plurality of hubs positioned end to end and loosely mounted on the shaft, a ratchet wheel fixed at one end of each hub, a gear secured to each hub beside the ratchet wheel, an operating quadrant loosely mounted on each hub alongside each gear, a hook on each quadrant adapted to engage with the associated ratchet wheel and turn it in one direction on operation of the quadrant, an indicating disk driven by each gear, a cam member secured to the opposite end of each hub and adjacent the ratchet wheel on the adjacent hub, said cam member having a plurality of cam surfaces disposed between shoulders on said member, a spring actuated dog bearing against the edge of each cam member, a bell crank lever pivotally mounted on each dog and having an arm engaged with the ratchet wheel on the adjacent bushing, and a separate dog for each ratchet wheel normally preventing backward rotary movement of a ratchet wheel and attached mechanism.

9. In a computing machine a horizontal shaft, a plurality of computing units placed end to end and loosely mounted on the shaft each comprising a hub, a ratchet wheel secured at one end of each hub, a cam member secured at the opposite end of each hub and closely adjacent the ratchet wheel on the adjacent hub, said cam member having a plurality of cam surfaces disposed between equally spaced shoulders on said cam member, means to operate each hub and attached ratchet wheel and cam member in one direction, a dog engaged with each ratchet wheel to prevent movement in the opposite direction, a vertically positioned spring actuated dog back of and bearing against the cam surfaces of each cam member, a bell crank lever pivotally mounted on each of said last mentioned dogs, one arm thereof engaging with the teeth of the ratchet wheel of the adjacent computing unit, and a spring connecting the other arm of said lever and ratchet engaging dog.

10. In a computing machine, a horizontal supporting shaft, a plurality of hubs loosely mounted in alinement on the shaft, a ratchet wheel having forty teeth fixed at the right hand end of each hub, a gear wheel having forty teeth located beside and rotatable with each ratchet wheel, an operating quadrant loosely mounted on each hub and provided with equally spaced projections on its outer edge to form nine finger spaces between the projections, means for connecting it with the ratchet wheel, an indicating disk rotatably mounted above each ratchet and gear wheel, a pinion of ten teeth connected to each disk and meshing with a gear wheel, equally spaced figures from zero to nine consecutively printed around each disk, a cam member fixed to the left end of each hub, provided with four equally spaced substantially radial shoulders, four cam surfaces disposed between the shoulders, a large dog pivotally mounted between its ends below the shaft, back of each cam member, a spring forcing the upper end of each dog against a cam member, and a spring actuated arm pivotally mounted on each dog and engaging with the ratchet wheel fixed on the adjacent hub to the left, substantially as described.

11. In a computing machine, a horizontal supporting shaft, a plurality of hubs loosely mounted in alinement on the shaft a ratchet wheel of forty teeth fixed at the right end of each hub, a gear wheel of forty teeth beside each ratchet wheel and movable therewith, an operating quadrant having nine equally spaced finger spaces in its outer edge loosely mounted on each hub, a hook on each quadrant for connection to the associated ratchet wheel, a disk rotatably mounted above each hub, indicating figures from zero to nine in equally spaced and consecutive order on the surface of the disk, a pinion of ten teeth on each disk meshing with a gear wheel, and means for moving a hub at the left one-fortieth of a revolution on movement of the hub at its right one-quarter of a revolution, substantially as described.

12. A computing machine including a rotary indicating disk, an oscillatory operating segment, means for yieldably urging the oscillatory operating segment in one direction, and means for transmitting motion from the oscillatory segment to the indicating disk.

13. A computing machine including an indicating disk, a ratchet wheel, gearing for transmitting motion from the ratchet wheel to the indicating disk, an oscillatory oscillating segment, and a pawl or dog carried by the segment for engaging the ratchet wheel to turn the same.

14. A computing machine including an indicating disk, a ratchet wheel, gearing for transmitting motion from the ratchet wheel to the indicating disk, an oscillatory operating segment, a spring connected with the segment for urging the same in one direction, and a pawl or dog carried by the segment and arranged to engage the ratchet wheel to engage the same when the segment is operated.

In testimony whereof I affix my signature.

FRED H. DOERR.